United States Patent
Unger

(10) Patent No.: US 7,786,996 B2
(45) Date of Patent: Aug. 31, 2010

(54) SYSTEM AND METHOD FOR OBJECT ORIENTED HARDWARE INCLUDING CROSS-POINT SWITCH INTERCONNECTING MODULES WITH I/O

(75) Inventor: Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 660 days.

(21) Appl. No.: 11/726,593

(22) Filed: Mar. 22, 2007

(65) Prior Publication Data

US 2008/0098438 A1    Apr. 24, 2008

Related U.S. Application Data

(60) Provisional application No. 60/854,191, filed on Oct. 24, 2006.

(51) Int. Cl.
*G06T 1/20* (2006.01)
*G09G 5/00* (2006.01)
*G06F 9/44* (2006.01)
*G06F 15/76* (2006.01)
*G06F 13/12* (2006.01)
*G06F 3/00* (2006.01)

(52) U.S. Cl. ............... 345/506; 345/619; 345/660; 717/108; 717/120; 712/35; 710/72; 715/719

(58) Field of Classification Search ........... 345/506, 345/619, 660; 717/108, 120; 712/35; 710/72; 715/719
See application file for complete search history.

(56) References Cited

U.S. PATENT DOCUMENTS

| 5,264,948 | A |   | 11/1993 | Imoto |           |
|-----------|---|---|---------|-------|-----------|
| 5,608,448 | A | * | 3/1997  | Smoral et al. | 725/92 |
| 5,905,726 | A | * | 5/1999  | Gupta | 370/390 |
| 6,128,467 | A | * | 10/2000 | Rege | 725/116 |
| 6,615,279 | B1 | * | 9/2003 | Robinson | 719/315 |
| 7,062,769 | B1 | * | 6/2006 | Ma et al. | 719/312 |
| 7,310,423 | B2 | * | 12/2007 | Hobrock et al. | 380/241 |
| 2002/0015401 | A1 |   | 2/2002 | Subramanian et al. | |
| 2002/0031166 | A1 |   | 3/2002 | Subramanian et al. | |
| 2002/0059623 | A1 |   | 5/2002 | Rodriguez et al. | |
| 2003/0059047 | A1 |   | 3/2003 | Iwamura | |
| 2005/0125357 | A1 | * | 6/2005 | Saadat et al. | 705/57 |
| 2005/0154801 | A1 | * | 7/2005 | Neuman et al. | 710/22 |
| 2006/0053457 | A1 |   | 3/2006 | Guenebaud | |
| 2006/0182076 | A1 |   | 8/2006 | Wang | |
| 2007/0180485 | A1 | * | 8/2007 | Dua | 725/114 |

OTHER PUBLICATIONS

Thinkquest, Logic Gates, Sep. 26, 1996, http://library.thinkquest.org/12666/switches.html.*

"Parallel Image Processing System—a Modular Architecture Using Dedicated Image Processing Modules and a Graphics Processor", Rahman, S. Clarkson, T.G. IEEE Region 10 Conference on Computer and Communication System, 1990. vol. 1 pp. 319-323.

(Continued)

*Primary Examiner*—Hoang-Vu A Nguyen-Ba
(74) *Attorney, Agent, or Firm*—John L. Rogitz

(57) ABSTRACT

A system of inter-connectable modules that can be used to build consumer electronic sub-systems and products. Familial features are included for easy setup and control. Data is passed between modules using a common interface to permit easy routing and reconfiguration of data flows.

7 Claims, 1 Drawing Sheet

- First example system

OTHER PUBLICATIONS

"A New Approach to Radio Astronomy Signal Processing: Packet Switched, FPGA-based, Upgradeable, Modular Hardware and Reusable, Platform-Independent Signal Processing Libraries". Parsons et al. http://seti.berkeley.edu/casper/papers/200509URSI.pdf. 2005.

* cited by examiner

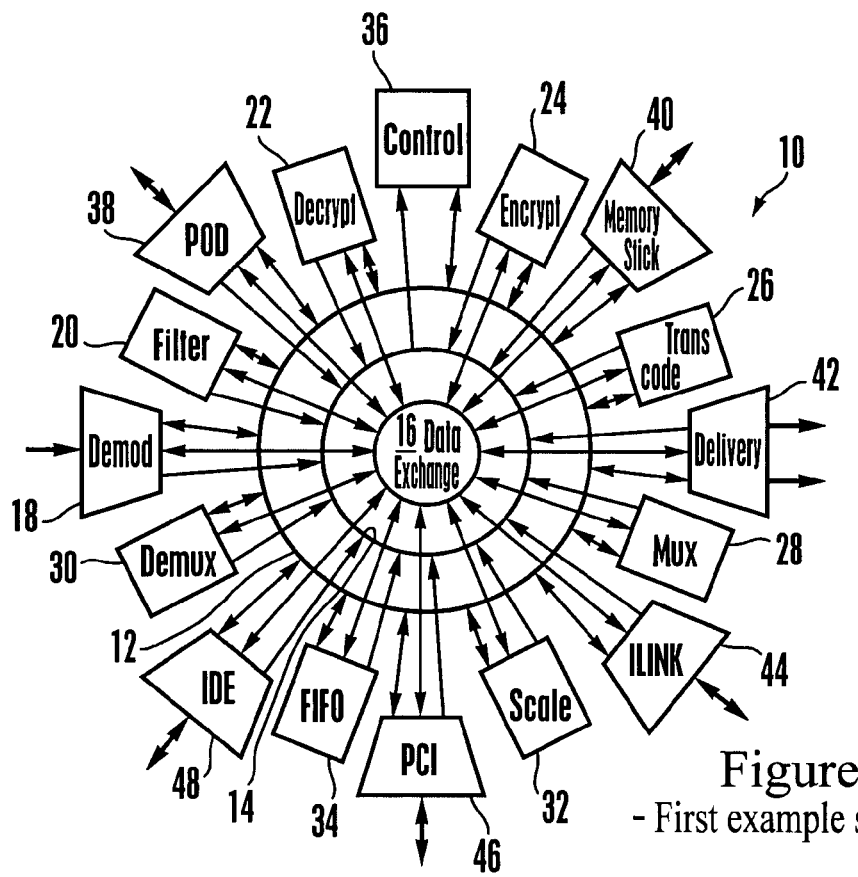
Figure 1
- First example system
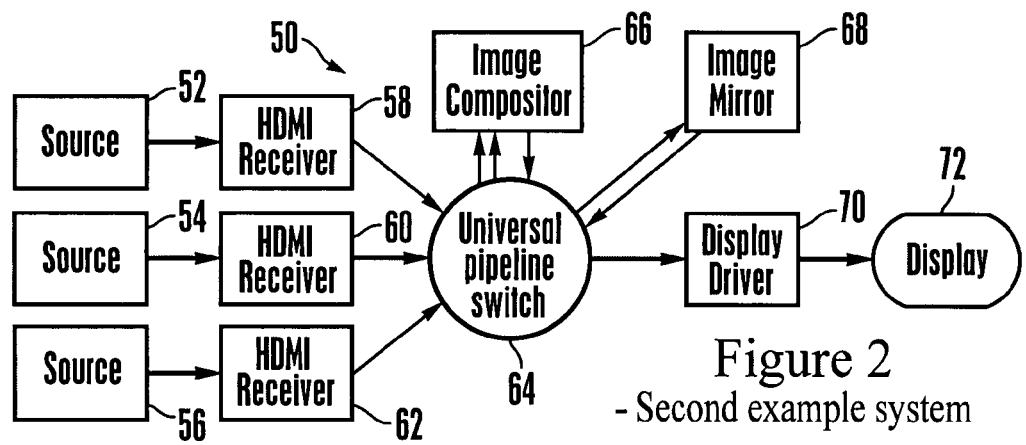
Figure 2
- Second example system
Figure 3 - example module (scaler)
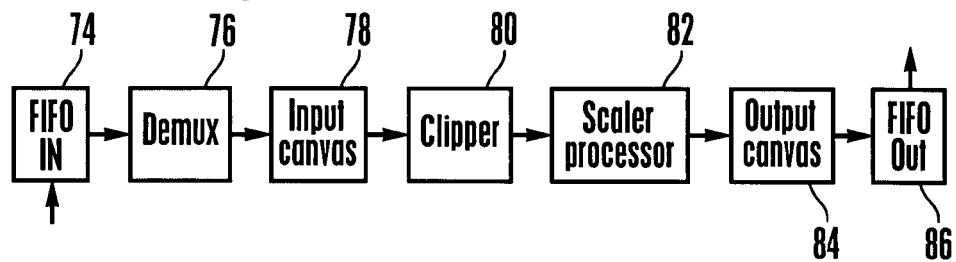

SYSTEM AND METHOD FOR OBJECT ORIENTED HARDWARE INCLUDING CROSS-POINT SWITCH INTERCONNECTING MODULES WITH I/O

RELATED APPLICATION

This application claims priority from U.S. provisional application 60/854,191, filed Oct. 24, 2006.

FIELD OF THE INVENTION

The present invention relates generally to systems and methods for object-oriented hardware.

BACKGROUND OF THE INVENTION

A complicated task is usually tackled by breaking it down into smaller tasks. In software this is referred to as object oriented design. Objects are defined as self contained modules of functionality.

Today's approach to digital product design (such as, e.g., the design of digital televisions) is focused on maximizing integration with the ideal of a system on a chip. As recognized herein, this hardware complexity results in a long lead time which may sacrifice flexibility for unit cost savings. By the time a chip is ready, it may lack some desired features and yet include unused capabilities. Additional parts thus may be required achieve the desired feature set while at the same time building up the amount of obsolete or at least no longer desired capabilities of the chip. Software is then given the task of making all the components work together.

As further recognized herein, a digital product need not always require a general purpose computer. Moreover, time-sharing generic busses may not be the best way to move dedicated data.

As still further recognized herein, most consumer electronics have a specific task to perform and any changes to the task are paced by slow human input. Task breakdown usually entails a series of steps or functions that are performed as a serial pipeline, with specific products varying by details of specific functions and the performance order. Thus, such CE products including digital televisions are, as understood herein, candidates for object-oriented hardware architecture.

SUMMARY OF THE INVENTION

An object-oriented hardware system includes one or more hardware-implemented signal processing modules each configured to execute a single function and one or more input and/or output modules configured to send data to or receive data from the signal processing module. The signal processing module is more than a single electronic component and is less than an entire separately-vended CE device.

For example, the signal processing module can be a filter module, a decryption module, an encryption module, a transcode module, a multiplexer module, a demultiplexer module, a scaler module, or a high definition media interface (HDMI) receiver module. In contrast, the input and/or output module can be a first in first out (FIFO) buffer module, a P_O_D_ ("POD") module, a removable memory medium, a video delivery module, an iLink interface module, a personal computer interface (PCI) interface module, and an integrated drive electronics (IDE) interface. A universal pipeline switch may be used to connect the modules to, e.g., an image compositer module, or an image mirror module, with video information from the HDMI receiver being sent to a display driver module for display of video on a visual display.

In another aspect, a method for architecting a consumer electronic (CE) device includes establishing plural object-oriented hardware modules with common communication capabilities. The method also includes selecting a subset of the modules and configuring the subset of modules in a design to achieve the CE device.

In yet another aspect, an object-oriented hardware system includes one or more hardware-implemented signal processing modules and one or more input and/or output modules configured to send data to or receive data from the signal processing module. The signal processing module is more than a single electronic component and is less than an entire separately-vended CE device.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a first example object-oriented hardware system;

FIG. 2 is a block diagram of a second example object-oriented hardware system; and FIG. 3 is a block diagram of an example module (a scaler) that can be used in an object-oriented hardware system.

DETAILED DESCRIPTION OF THE PREFERRED EMBODIMENT

In general overview, the present invention recognizes that the architecture for a CE product can be designed using a library of hardware objects connected together using a common interface structure. As understood herein, this hardware modularity maximizes product feature flexibility and permits commoditization at the module level rather than at the product level. Object-oriented hardware architecture implicates three issues addressed below: objects, interfaces, and data routing.

Referring initially to FIG. 1, a first non-limiting object-oriented hardware system is shown, generally designated 10, in which various hardware-implemented modules (also referred to herein as "objects") follow desired functions. That is, any function performed in a system is a candidate as a hardware module. This breakdown permits easy use and substitution of function as needed.

By "hardware module" or "hardware object" is meant more than a single electronic component such as a single resistor, capacitor, or transistor and less than an entire separately-vended CE component such as an entire TV, disk player, PVR, etc.

Among the hardware objects that are contemplated herein are NTSC tuners, ATSC tuners, analog input modules for composite, S-Video, and component input, an IP network communication module, a HDMI (or DVI) input module, a VGA input module, a decoder (MPEG, AVC, DV, etc.) module, a scaler module, an image enhancement module (e.g., a de-interlace module), a graphics generator module for generating user interfaces, and a display driver module.

Accordingly, it may be appreciated that an object oriented hardware approach establishes a library of modules that can be pipelined together or switched in/out of the data path to achieve the desired functionality.

FIG. 1 shows a first example system 10 using present object-oriented hardware principles that may be employed as a video processing system for a TV. Each of the elements shown in FIG. 1 may be implemented by a respective hardware module, and all the hardware modules may be located on the same substrate if desired. The modules communicate by means of three switches 12, 14, 16 to effect data exchange. The switches 12, 14, 16 may be cross point switches that permit any input to be routed to any output, as more fully disclosed below.

Among the modules shown in the non-limiting example of FIG. 1 are a demodulator module 18 that receives information from, e.g., an audio-video source. A filter module 20 may be provided to filter the signal and a decryption module 22 may likewise be provided to decrypt an encrypted data stream. Likewise, an encryption module 24 may be provided to encrypt data that is output by the system 10. Transcoding of video can be undertaken by a transcode module 26.

Multiplexing of outgoing data and demultiplexing of incoming data can be provided by a multiplexer module 28 and a demultiplexer module 30, respectively. Video scaling may be provided by a scaler module 32, and data input and/or output handled by a first in first out (FIFO) buffer module 34. A control module 36 that may be implemented by a field programmable gate array (FPGA) may control/coordinate various activities of the above signal processing modules.

In addition to the above signal processing modules each of which in general is configured to execute one and only one function, FIG. 1 shows that the system 10 may also include various input/output modules for communicating with components external to the system 10. By way of non-limiting example, the system 10 may include a P_O_D_ ("POD") module 38, a removable memory medium 40 such as a Sony Memory Stick (which is a trademark of Sony Corp.), a video delivery module 42, an iLink interface module 44, a personal computer interface (PCI) interface module 46, and an integrated drive electronics (IDE) interface 48.

FIG. 2 shows another example object-oriented hardware module system 50 that can be used to drive a TV display. As shown, the system 10 can receive video information from first through third source interface modules 52, 54, 56, each of which can send video stream protected by digital rights management to a respective high definition media interface (HDMI) receiver module 58, 60, 62. The streams from the HDMI receiver modules can be switched through a universal pipeline switch 64 to appropriate signal processing modules such as an image compositer module 66 (for, e.g., rendering a composite image from the three data streams) and an image mirror module 68. Outputs of the signal processing modules can be sent through the switch 64 as shown to a display driver 70 for presenting video images on a TV display 72.

A more detailed example of a module used in a digital TV can be seen in FIG. 3, which illustrates a scaler module. The illustrated scaler module receives frames of video at an input FIFO 74, demultiplexes it at a demultiplexer 76, and then processes it through an input canvas 78, clipper 80, and scaler processor 82 to resize the video to meet needs of subsequent modules. The resized video is sent through an output canvas 84 and output to subsequent modules through an output FIFO buffer 86. Control parameters can describe the input format and the desired output format. Microcode can be loaded or selected if there are options for the scaler algorithm.

As understood by the present invention, the above-described hardware modularity is most versatile when a common interface is used to interconnect modules. While specialized modules interface to outside components, internal interconnections are interchangeable because of the shared interface.

An important interface carries the pipelined data from module to module. Serial multi-gigabit technologies such as those used for PCI express and gigabit Ethernet can be used. These communication methods transfer data over a simple pair of wires traversing tens of centimeters, easily accommodating distribution within, e.g., a TV chassis. Data rates for each module in a pipeline can be common to the system or be programmed to match the fixed or dynamic needs of each point-to-point connection. Digital rights management support may also be included to protect data.

Other components of a common interface can include a means to exchange control and status information. This could be serviced by I2C or similar low bit rate bus to avoid royalty issues. A common reference clock source can be distributed to all modules. An internal phase-locked loop (PLL) or similar clock multiplier could use, e.g., 25 MHz to generate the required internal clocks. A low speed metronome-like strobe (i.e., a frame clock) can be used for system synchronization.

Turning now to data routing, dedicated simple connections can exist between modules that always feed each other, but as mentioned above greater flexibility can be achieved by using switches. These can also facilitate clustering modules in different areas on the chassis. Switches can range from low tech selectors to much more versatile cross points.

A cross point switch permits any input to be routed to any output (even more than one output simultaneously). Dynamic configuration can be used to change modules in and out of the logical pipeline. Even the sequence order can be changed. FIFOs can be implemented at the junction points to smooth out data and match clock rates.

In addition to the above description, as contemplated herein the object-oriented hardware modules of the present invention can be unit tested then verified as an addition to a known working system. New modules can be phased into active production lines. The most versatile form of integration is to connect each module to a single cross point.

Or, modules may be combined into sub-systems that appear as a single module with a superset of capability. An example might be for an analog input interface that could be used across multiple products. Common packaging for modules that frequently are used in the same product can result in cost savings. Other modules can be configured as physical plug-ins that encourage field upgrades.

For system setup and control a simple microprocessor or a state machine may be used, as mentioned above in relation to FIG. 1. Control can include object initialization and data routing specification.

Operation of a module pipeline can start with selection of an operational mode. This will cause any necessary microcode to be loaded (via the pipeline bus) and switches to be set matching the desired topology. Specifics can be described in a table to make mode changes easy.

With the above disclosure in mind, it may now be appreciated that object oriented hardware is an advantageous systems approach to design and build digital consumer electronics. It splits the product into separate functional tasks that can be perfected in isolation and be swapped in and out to meet the needs of the customer. It is very agile and permits rapid response to changes and demands in the marketplace.

Additional Non-Limiting Implementation Details

Data can be transmitted serially with a sync line asserted when the first bit of a serial burst or buffer is sent. The sync signal may be removed immediately after the first data bit or any time before the gap time between bursts. Receiving modules may use the asserting edge of the sync signal to indicate the start of a new buffer. The format of a buffer can be anything agreed to by both the sending and receiving modules. A typical format might be that of a serial MPEG2 transport stream.

"Push" mode may be implemented by having the sending module drive the clock line. "Pull" mode can be implemented by having the receive module drive the clock line. An optional ready line can be driven by the side not driving the clock for flow control. A fifth line can be used to flag buffers with errors but generally transmission and content errors can be handled with "in band" bits or by using the control/notification busses. Push/pull mode can be a configuration register option for all serial data stream connections.

Each serial port connection can be configurable as to direction and stream type. Four or five pins may be used for each port. The primary four signals may be used for serial transport streams and the fifth provides a mechanism for the external device to provide a stream address.

Serial data (input/output)
Data clock (input/output)
Data sync (input/output—same as data)
Valid/ready (not valid asserted by source, not ready asserted by receiver)
Address (input indicates stream being transferred)

The cross point switch mentioned above can have addressable ports when the clock is supplied externally. This means an additional input line that provides the cross point with an asynchronous address value to further specify the port address. The port subaddress may be supplied by first asserting a start bit and then a four bit address value and check bit for a total of six bits. Bit transitions can be synchronized by the system generic clock value. The sub address may remain in effect until explicitly replaced by another sub address. This feature is useful when connecting to devices that have time multiplexed streams such as 1394, USB, Ethernet, etc.

The interface used to pass data between modules may be standardized to facilitate easy interconnection.

In addition to a connection to the control bus, modules can have input data streams, output data streams, a connection to the notification bus, and even a connection to an outside bus or device.

Inter-Module Communication Summary

Communication between the modules can use three common mechanisms—control, notification, and data. All three can be serial implementations to minimize the number of connections.

Traits that may be common to all modules
System clock
Software reset
Power save mode Several characteristics may be common to all modules. A system clock is supplied to all modules to be used for timing purposes. (This clock may be used for serial data bus clocking, but it is not required.) A control register can be used to reset a module to the same state as power-up. Another register can be used to put the module into power save mode. When in power save mode, the module uses the least amount of power possible by only being receptive to a command to leave power save mode.

Control/Status Bus

Control can be performed via an I2C bus. This provides access to configuration registers, command delivery and status retrieval.

Notification Bus

One of the buses above may be a notification bus that can be used for special completion or contingency type messages typically implemented in an interrupt structure. Each module that can produce a notification can have a configuration register for each possible use. Notifications may be queued for processing by the control module(s). Any type of module can send a notification, but only a control module is expected to process it.

Each notification may be 32 bits long and in a format defined by the control module. (Recall that the control module is responsible for initializing the configuration registers in each module.) A value of zero is assumed to be inactive and is the power up or reset condition. Bits within the notification may be assigned to indicate the ID of the servicing control module, the notification priority and the notification description.

Notifications may either be self regenerative or require re-arming to be resent. Self regenerating notifications may be sent automatically every time an event happens to trigger the notification. This would usually apply to aperiodic and unexpected events. State sensitive notifications such as buffer starvation may be sent only on the state change and not repeatedly sent with each system clock. Re-armed notifications may require a command to acknowledge the notification before can be resent.

The notification bus may be a single line with open collector drivers and the system clock used for edge synchronization. Any module can drive the bus low at any time. Before sending a notification, a module listens to the notification bus for sixteen clock periods (notification length) to assure that the bus is quiescent. Each notification can be initiated by asserting a start bit followed by the data bits MSB first. As a module is asserting logical one bits of its notification, it checks to see if another module is asserting a logical zero at the same time. If such a collision is detected, the module asserting a logical one suspends its assertion and waits for the bus to be quiescent again. This collision management scheme causes the lowest value notification to have the highest priority and introduces no delay to the higher priority notification.

A special circuit may be used to receive the notifications. It can act as a prioritizing pre filter for the servicing CPU or other control device. Notifications can be queued in FIFO like list in priority order. A level type interrupt can be asserted whenever any notifications are queued. Reads of the device (it looks like a location of memory) can produce the highest priority (lowest numeric value) pending notification. Reading an empty notification can produce a value of "all ones" indicating a null notification. A special notification can be self generated by the device if the queue overflows. (High order bits a zero, n low order bits indicating the number of discards.)

Examples of modules that can be used include
QAM demodulator
8VSB demodulator
Cross point switch
NTSC to MPEG2 transcoder
MPEG to NTSC transcoder
DV to MPEG2 transcoder
PID filter and translator
Serial data stream to CPU buffer (via PCI initiator)
CPU buffer to Serial data stream (via PCI initiator)
Decryption module
Encryption module
Video demultiplexor (output component video)
Audio demultiplexor (right/left outputs)
Audio demultiplexor (5.1 outputs)
Audio demultiplexor (other outputs)
Generic FPGA (with dynamically downloadable program)
System controller (CPU with RAM, ROM, flash)
Data stream FIFO Voice over IP
Point of Deployment (POD)
DAVIC
DOCSIS
i.LINK (1394)
Memory Stick
IDE FIFO Module The FIFO modules can be memory elements used to buffer data on a First In/First Out basis. They can also be used as a store and forward element, a delay line, rescan buffer mode, or even flow control based upon time stamps.

As a FIFO, data can be pushed in (or pulled in when data is available) from the upstream element and pulled out by the downstream element. Data bits are normally stored individually but a run length encoding scheme could be used for compressible data. For stream types with long data blocks, sync bits from the input stream may be preserved within the FIFO by counter registers organized as a subFIFO within the main FIFO. A counter register can be incremented as data bits are clocked in. When a sync bit is encountered, the register can be pushed onto the subFIFO and a new counter started. As data bits are pulled out of the FIFO, the oldest counter is decremented with each bit until the counter reaches zero. At this point the output sync signal is asserted and the next counter pulled from the subFIFO. For short data block stream types, the sync bits can be stored as a parallel bit stream to the main data stream.

Store and forward feature may be used to move status information from the end of a data buffer to the beginning. Data may be pushed into the FIFO in the normal manner but output availability is held off until the entire buffer has been received. A programmable counter may be used to specify the length of the buffer. The final trailing bits received may be preserved as buffer status and the output side of the FIFO is enabled. The status bits can be transmitted (stream location TBD) first before the main data. This feature permits a source module (without its own storage) to build a buffer on the fly and flag a flaw after the fact. The destination module (also without its own storage) learns of the flaw up front.

The FIFO can be used as a delay line by programming a minimum buffer depth. Data is pushed in as with a normal FIFO but output availability is not asserted unless the required amount of data is queued. This eases the job of synchronizing multiple streams (i.e. audio lip sync).

Rescan buffer mode permits the same data to be pulled from the buffer repeatedly until replaced by a fresh push. This can be used for insertion packets that are injected periodically into a stream but are updated only occasionally. Random writes are permitted.

Flow control FIFOs can be implemented by prepending a time stamp to the beginning of each buffer. This time stamp may have been done by an upstream process or as part of the FIFO input hardware. Data out of the FIFO can be held up until the internal time reference reaches the time stamp value attached to the buffer on the head of the queue or the next buffer is discarded if its time stamp is "stale".

The input ready line can be programmed to range in meaning from actually full to a water mark, and the same is true for the output ready line. Read and write pointers can be under program control.

PCI support requires one of the more complicated modules. Module features may include PCI interface configuration registers, memory mapped access to the I2C control/status bus, and DMA like support for multiple stream transfers.

Eight simultaneous serial data stream transfers can be active at one time. Each stream has a double ranked set of address/counter registers and several operating modes. The counter specifies the number of bytes to transfer and the address points to the transfer location on the PCI memory bus. A stream specific control register specifies the transfer direction, if double stacking is active, if the same buffer is to be used as a continuous loop, how to report transfer complete, if the transfer is push/pull, etc.

Additionally, a system may include any number of CPU modules. If CPU support is provided outside the module, there not need be any internal CPU. At the other end of the spectrum can be systems with multiple CPU modules. One CPU might handle security issues such as key handling and generation. Another CPU might turn front end modules that tune, FEC, and demodulate a signal into a self standing tuner subsystem.

The cross point switch referred to above can be used as a generic and flexible means to exchange data between modules Any input can be routed to any output. Inputs can be routed to more than one output simultaneously. Cross point switches can be cascaded to form larger switches that can handle more streams.

The cross point ports can be programmed to operate in either push or pull mode and could even include a small amount of buffering to eliminate the need for a full FIFO.

Accordingly, modules in accordance with present principles may fall into five basic categories, namely, control, data exchange, internal processing, storage, and edge or external interface. Control modules are responsible for conscious decision making and orchestrating the data flow between the processing modules. Data exchange modules serve as an autonomous nervous system to keep the data flowing with a minimum of control intervention. A combination of physical and logical "plumbing" routes the data streams between modules. Processing modules combine, split, and transform data to achieve their design function. One or more data streams may be input and one or more data streams may be output. Programmed registers control the value added features. Storage modules preserve data between processes and are usually implemented as FIFOs. Edge pieces interface with the outside world. This might be an electrical transformation such as analog to digital.

While the particular SYSTEM AND METHOD FOR OBJECT ORIENTED HARDWARE is herein shown and described in detail, it is to be understood that the subject matter which is encompassed by the present invention is limited only by the claims.

What is claimed is:

1. An object-oriented hardware system comprising:
at least first, second, and third hardware-implemented signal processing modules configured to execute respective first, second, and third functions, wherein the first module does not execute the second or third function, the second module does not execute the first or third function, and the third module does not execute the first or second function;
at least one input and/or output module configured to send data to or receive data from the signal processing modules, the input and/or output module not executing the first, second, or third function; and
at least three cross point switches interconnecting the plural signal processing modules with each other and interconnecting the input and/or output module with each of the signal processing modules, the cross point switches not executing the first, second, or third function and being configurable to permit output of any module to be routed to any other module to thereby establish a logical pipeline of modules, such that the switches are dynamically configured to change modules in and out of the logical pipeline and to change a module sequence order of the logical pipeline.

2. The system of claim 1, wherein the signal processing modules are selected from the group of modules comprising a filter module, a decryption module, an encryption module, a transcode module, a multiplexer module, a demultiplexer module, and a scaler module.

3. The system of claim 1, comprising a filter module, a decryption module, an encryption module, a transcode module, a multiplexer module, a demultiplexer module, and a scaler module, the modules communicating with each other by means of one of the cross point switches.

4. The system of claim 3, comprising a first in first out (FIFO) buffer module, a removable memory medium, a video delivery module, a personal computer interface (PCI) module, and an integrated drive electronics (IDE) interface.

5. The system of claim 1, wherein the at least one input and/or output module is selected from the group comprising a first in first out (FIFO) buffer module, a removable memory medium, a video delivery module, a personal computer interface (PCI) module, and an integrated drive electronics (IDE) interface.

6. The system of claim 1, wherein at least one of the signal processing modules is a high definition media interface (HDMI) receiver module.

7. The system of claim 6, comprising a universal pipeline switch connecting the HDMI receiver module to at least one of: an image compositer module, or an image mirror module, with video information from the HDMI receiver module being sent to a display driver mode module for display of video on a visual display.

\* \* \* \* \*